US011796327B2

United States Patent
Oyama

(10) Patent No.: US 11,796,327 B2
(45) Date of Patent: Oct. 24, 2023

(54) ROUTE SUBDIVISION APPARATUS

(71) Applicant: Honda Motor Co., Ltd., Tokyo (JP)

(72) Inventor: Takahiro Oyama, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 435 days.

(21) Appl. No.: 17/272,969

(22) PCT Filed: Aug. 30, 2019

(86) PCT No.: PCT/JP2019/034096
§ 371 (c)(1),
(2) Date: Mar. 3, 2021

(87) PCT Pub. No.: WO2020/050164
PCT Pub. Date: Mar. 12, 2020

(65) Prior Publication Data
US 2021/0341297 A1 Nov. 4, 2021

(30) Foreign Application Priority Data
Sep. 6, 2018 (JP) ................................. 2018-167050

(51) Int. Cl.
G01C 21/34 (2006.01)
G08G 1/123 (2006.01)
(Continued)

(52) U.S. Cl.
CPC ....... *G01C 21/3407* (2013.01); *G06Q 10/047* (2013.01); *G08G 1/123* (2013.01); *G06Q 10/08355* (2013.01)

(58) Field of Classification Search
CPC .......... G01C 21/34; G08G 1/123; G08G 1/13; G08G 1/00; G06Q 10/08
See application file for complete search history.

(56) References Cited

U.S. PATENT DOCUMENTS 10,852,727 B2* 12/2020 O'Dea ................. G05D 1/0088
2015/0353087 A1* 12/2015 Niino .................... B60W 50/14
701/96
(Continued)

FOREIGN PATENT DOCUMENTS

CN 108460488 A 8/2018
JP 2001133277 A 5/2001
(Continued)

OTHER PUBLICATIONS

India Office action; application 202117013461; dated Sep. 9, 2021.
(Continued)

*Primary Examiner* — Tan Q Nguyen
(74) *Attorney, Agent, or Firm* — Duft & Bornsen, PC

(57) ABSTRACT

A route subdivision apparatus configured to subdivide a travel route for conducting work that includes: an area setting unit configured to set a plurality of work areas on a map; a route setting unit configured to set a scheduled route from a start point to an end point so that the scheduled route passes through consecutive first to third areas of the plurality of work areas; an entry/exit point setting unit configured to set an entry point and an exit point of the scheduled route in each work area; a boundary setting unit configured to set a boundary point between the exit point of the first area and the entry point of the second area and between the exit point of the second area and the entry point of the third area; and a distance calculation unit configured to calculate a length of a distance of each section divided by the boundary point on the scheduled route.

18 Claims, 10 Drawing Sheets

(51) Int. Cl.
    *G06Q 10/047*     (2023.01)
    *G06Q 10/0835*     (2023.01)

(56) References Cited

U.S. PATENT DOCUMENTS

2017/0088144 A1*   3/2017   Shibata ............ G08G 1/096758
2019/0250001 A1*   8/2019   Nakamura ........... G05D 1/0088

FOREIGN PATENT DOCUMENTS

| | | |
|---|---|---|
| JP | 2001507143 A | 5/2001 |
| JP | 2003111209 A | 4/2003 |
| JP | 2006168914 A | 6/2006 |
| JP | 2012208882 A | 10/2012 |
| JP | 2015141477 A | 8/2015 |
| WO | 2014024773 A1 | 2/2014 |

OTHER PUBLICATIONS

Chinese Office action; Application 201980057727; dated Mar. 31, 2022.
International Search Report; Application PCT/JP2019/034096; dated Oct. 8, 2019.

* cited by examiner

| SEQ | SECTION | CORRESPONDING AREA | ACTUAL REQUIRED TIME | DIFFERENCE | SCHEDULED REQUIRED TIME |
|---|---|---|---|---|---|
| 1 | TRAVEL SECTION $SCT_{BA}$ | NON-WORK AREA BA | 5MIN. 00SEC. | ±0MIN. 00SEC. | 5MIN. 00SEC. |
| 2 | WORK SECTION SCT1 | WORK AREA BL1 | 2MIN. 15SEC. | +0MIN. 15SEC. | 2MIN. 00SEC. |
| 3 | WORK SECTION SCT2 | WORK AREA BL2 | 2MIN. 30SEC. | -0MIN. 15SEC. | 2MIN. 45SEC. |
| ⋮ | ⋮ | ⋮ | ⋮ | ⋮ | ⋮ |

ROUTE SUBDIVISION APPARATUS

CROSS-REFERENCE TO RELATED APPLICATION

This application is a National Stage of PCT international application Ser. No. PCT/JP2019/034096 filed on Aug. 30, 2019 which designates the United States, incorporated herein by reference, and which is based upon and claims the benefit of priority from Japanese Patent Application No. 2018-167050, filed on Sep. 6, 2018, the entire contents of which are incorporated herein by reference.

TECHNICAL FIELD

This invention relates to a route subdivision apparatus for subdividing travel routes.

BACKGROUND ART

As this type of technique, conventionally, there have been known a device configured to grasp position of a user at any time based on positional information and time information derived from GPS signals received by a GPS receiver of a user terminal (e.g., see Patent Document 1). In the device disclosed in Patent Document 1, a travel route in a specific period is estimated based on a plurality of pieces of position information and time information in the specific period.

CITATION LIST

Patent Literature

Patent Document 1: Japanese Unexamined Patent Publication No. 2012-208882

DISCLOSURE OF INVENTION

Problems to be Solved by the Invention

However, since the device described in Patent Document 1 does not specify a specific section on the travel route and calculate the required time, it is difficult to subdivide the travel route to evaluate the travel route for each fine section.

Means for Solving Problem

An aspect of the present invention is a route subdivision apparatus configured to subdivide a travel route for conducting work. The route subdivision apparatus includes: an area setting unit configured to set a plurality of work area on a map; a route setting unit configured to set a scheduled route from a start point to an end point so that the scheduled route passes through consecutive first area, second area, and third area of the plurality of work area; an entry/exit point setting unit configured to set an entry point and an exit point of the scheduled route set by the route setting unit in each work area of the plurality of work area; a boundary setting unit configured to set a boundary point between the exit point of the first area and the entry point of the second area and between the exit point of the second area and the entry point of the third area; and a distance calculation unit configured to calculate a length of a distance of each section divided by a plurality of the boundary point set by the boundary setting unit on the scheduled route.

Effect of the Invention

According to the present invention, it becomes possible to subdivide the travel route.

DESCRIPTION OF EMBODIMENT

Now, an embodiment of the present invention will be described with reference to FIGS. 1 to 11. A route subdivision apparatus according to the embodiment of the present invention can be used in management systems that are used in various industries and that manage workers who work while traveling on multiple work areas and manage the travel routes of the workers. Hereafter, an example will be described in which the route subdivision apparatus is applied to a management system that manages delivery workers who deliver cargos, flyers, mail pieces such as letters and postcards, or the like. Specifically, an example will be described in which the route subdivision apparatus manages delivery workers who do delivery work at the distribution center of a distribution business, post office, or the like and manages the travel routes of the delivery workers.

To assign balanced workloads to delivery workers who do delivery work as described above, work areas are set such that the times required to work in the respective work areas are uniform. However, in practice, the required times may become longer or shorter than estimated due to an increase or reduction in the number of delivery destinations in the work area, a change in the surrounding traffic situation, or the like. For this reason, the route subdivision apparatus according to the present embodiment is configured as follows so that the travel routes of the delivery workers are evaluated in terms of the required times in the work areas.

[Functional Configuration of Management System 100]

Figure 1:
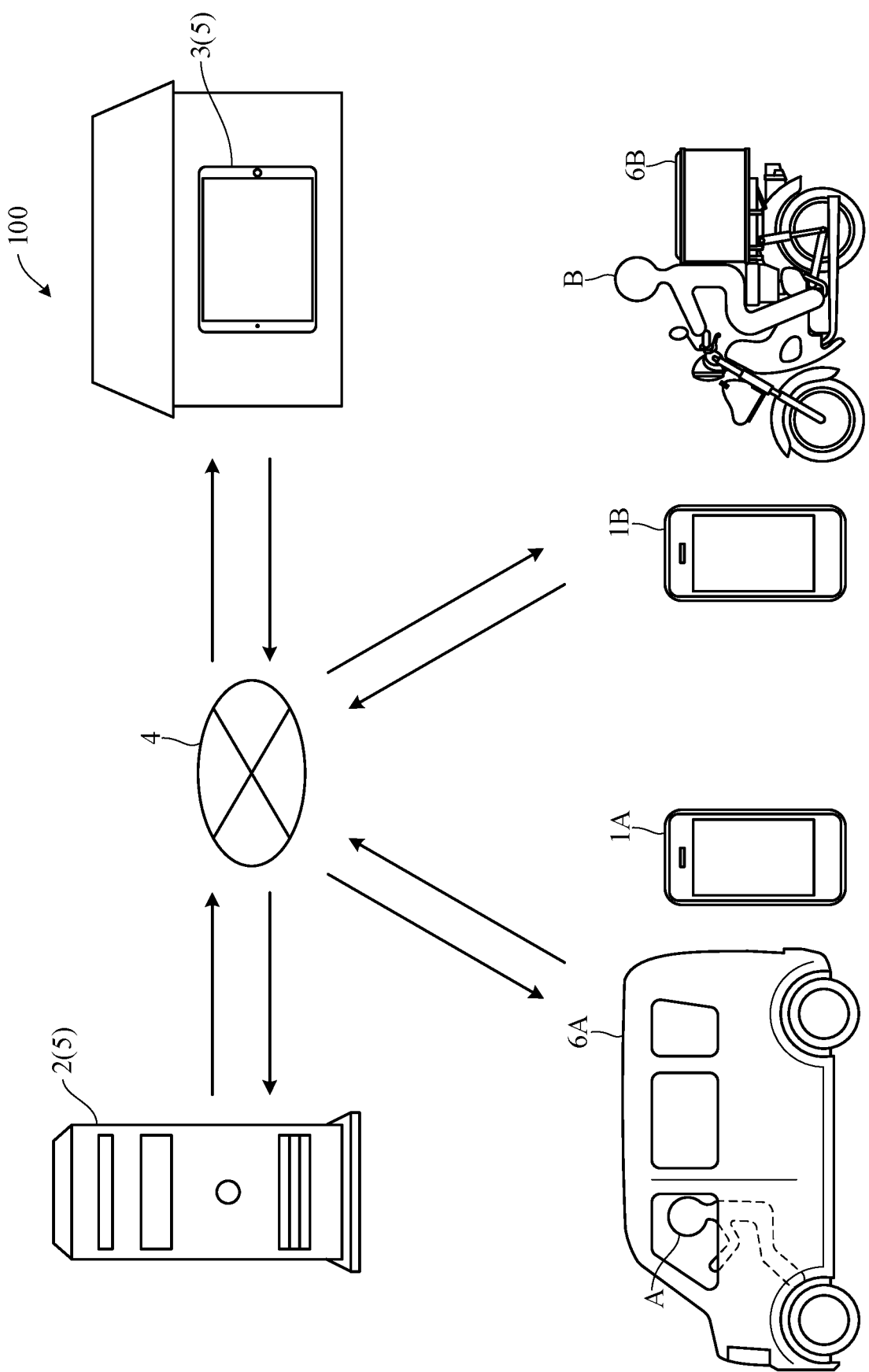
FIG. 1 is a diagram showing an example of the system configuration of a management system including a route subdivision apparatus according to an embodiment of the present invention.

First, the functional configuration of a management system 100 according to the embodiment of the present invention will be described. FIG. 1 is a diagram showing an example of the system configuration of the management system 100. As shown in FIG. 1, the management system 100 includes multiple (two in FIG. 1) delivery worker terminals 1A and 1B, a management server 2, and a manager terminal 3 that are connected through a network 4, including a public wireless communication network typified by the Internet network, mobile phone network, or the like. In the management system 100 thus configured, the management server 2 and manager terminal 3 form a route subdivision apparatus 5 according to the embodiment of the present invention. The management server 2 or manager terminal 3 alone may form the route subdivision apparatus 5. The network 4 also includes a closed communication network provided in a predetermined control area, such as a wireless LAN and Wi-Fi® (Wireless Fidelity).

The delivery worker terminals 1A and 1B are held in clothes pockets, bags, pouches, or the like of the delivery workers A and B, or disposed in the cradles or the like of vehicles 6A and 6B used for delivery work. In the present embodiment, smartphones or tablet terminals, mobile phones, personal digital assistants (PDAs), and various types of wearable terminals that are connectable to a public wireless communication network are collectively referred to as the delivery worker terminals 1A and 1B. The delivery worker terminals 1A and 1B have the same configuration. The number of delivery worker terminals may be three or more. The vehicles 6A and 6B are transportation vehicles, such as four-wheeled vehicles, motorcycles, bicycles, or carts. FIG. 1 shows a light truck (e.g., a truck having a predetermined displacement or less) 6A, which is widely being used to deliver or pick up cargoes, flyers, mail pieces such as letters and postcards, or the like, and a motorized bicycle (e.g., a motorcycle including a motor having a predetermined displacement or less) 6B as an example. The delivery workers A and B may perform delivery work on foot without using the vehicle 6A or 6B.

Next, the configuration of the delivery worker terminals 1A and 1B, management server 2, and manager terminal 3 will be described.

<Delivery Worker Terminals 1A and 1B>

First, the delivery worker terminals 1A and 1B will be described. Various types of application software can be installed on the delivery worker terminals 1A and 1B. The delivery worker terminals 1A and 1B form a part of the management system in accordance with application software installed on smartphones. By using commercially available smartphones, the system construction cost can be suppressed.

Figure 2:
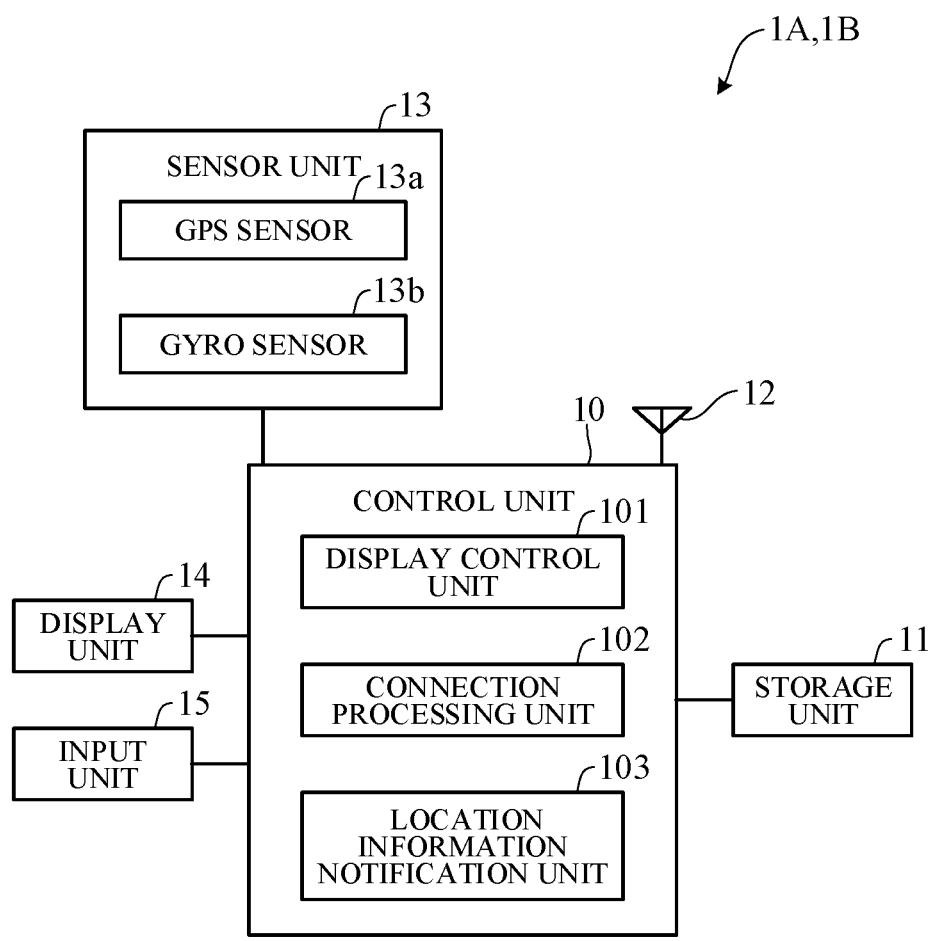
FIG. 2 is a block diagram showing a schematic configuration of a delivery worker terminal in FIG. 1.

FIG. 2 is a block diagram showing a schematic configuration of the delivery worker terminals 1A and 1B. As shown in FIG. 2, the delivery worker terminal 1A includes a control unit 10, a storage unit 11, a wireless unit 12, a sensor unit 13, a display unit 14, and an input unit 15.

The storage unit 11 consists of a semiconductor memory, hard disk, or the like. The storage unit 11 stores software, including an operating system (OS) and application programs for supporting delivery work, and various types of information, including map information such as road maps and residential maps and customer information about delivery destinations. The customer information includes the addresses and phone numbers of the delivery destinations, as well as customer-related information, such as whether the customers have delivery boxes. The software, map information, and customer information may be previously stored in the storage unit 11, or acquired from the management server 2.

The wireless unit 12 includes a digital signal processor (DSP) and the like and is configured to be able to wirelessly communicate with the management server 2 through a wireless communication network typified by a mobile phone network, such as 3G, LTE, 4G, or 5G. The wireless unit 12 may include a near-field wireless communication unit (not shown) capable of using a near-field wireless communication technology, such as Wi-Fi® or Bluetooth®. The wireless unit 12 is able to transmit a login ID for identifying the delivery worker A or B ("delivery worker ID"), information on the current location of the delivery worker A or B or vehicle 6A or 6B, speed information, and the like to the management server 2.

The sensor unit 13 includes a GPS sensor 13$a$ that receives locating signals from multiple GPS satellites and measures the absolute location (latitude, longitude) of the delivery worker A or B corresponding to the delivery worker terminal 1A or 1B, a gyro sensor 13$b$ that detects the angular velocity, and the like. If it is difficult to receive locating signals from the GPS satellites, the current location of the delivery worker A or B or vehicle 6A or 6B may be calculated using Assisted Global Positioning System (AGPS) communication on the basis of information on the base stations of the wireless communication network acquired from the wireless unit 12.

The display unit 14 consists of a display device, such as a liquid crystal display or organic EL panel. The display unit 14 receives an instruction from the control unit 10 and displays a map, a button icon for operating a touchscreen, or the like. The display unit 14 is also able to display various types of information, such as the current location of the delivery worker A or B or vehicle 6A or 6B, a map around the current location, and a map around the delivery destination.

The input unit 15 consists of a physical switch, such as a numeric keypad, operated by the delivery worker A or B, an input device (not shown), such as a touchscreen, disposed so as to be overlaid on the display surface of the display unit 14, or the like. The input unit 15 outputs a signal based on operation input, such as depression of the numeric keypad or touchscreen by the delivery worker A or B, to the control unit 10. Thus, for example, the screen display of the display unit 14 is changed.

Although not shown, the delivery worker terminals 1A and 1B may further include a speaker, vibrator, light, microphone, or the like. The speaker, vibrator, or light notifies the delivery worker of various types of information through a sound, vibration, or light. The speaker outputs a sound to the delivery worker, and the microphone collects a sound or the like issued from the delivery worker. Thus, the delivery worker terminals 1A and 1B are able to output various types of information from the speaker in the form of sounds and to input various types of commands inputted in the form of sounds through the microphone by the delivery worker to the control unit 10 using a sound recognition technology.

The control unit 10 includes a microprocessor including a CPU, RAM, ROM, I/O, and the like. The CPU executes a previously stored program and transmits and receives signals to and from the storage unit 11, wireless unit 12, sensor unit 13, display unit 14, and input unit 15. The control unit 10 includes, as functional elements, a display control unit 101, a connection processing unit 102, and a location information notification unit 103.

The display control unit 101 controls the screen display of the display unit 14 by generating image signals in response to an operation on the input unit 15 or in response to the wireless unit 12 receiving various types of information and transmitting the image signals to the display unit 14. Screens that the display control unit 101 causes the display unit 14 to display include a login screen for logging in to the management system 100, and the like.

The connection processing unit 102 transmits, to the management server 2 through the wireless unit 12, a login ID and a password inputted by the delivery worker A or B on the login screen displayed on the display unit 14 through the input unit 15. Thus, the delivery worker terminal 1A or 1B is communicatively connected to the management server 2. The delivery worker performs this login input when starting to work, that is, when departing from the distribution center. Also, when logout is inputted through the input unit 15, the connection processing unit 102 transmits the logout to the management server 2 through the wireless unit 12. Thus, the communication connection between the delivery worker terminal 1A or 1B and management server 2 is complete. The delivery worker performs this logout input when finishing work, that is, when returning to the distribution center. Logout may be automatically performed on the basis of the time or location information when the delivery worker returns to the distribution center.

The location information notification unit 103 transmits information on the current location of the delivery worker A or B or vehicle 6A or 6B traveling with the delivery worker terminal 1A or 1B calculated on the basis of GPS signals received by the sensor unit 13 (GPS sensor 13a), current time information acquired from a clocking unit (not shown), and the like to the management server 2 through the wireless unit 12 at predetermined time intervals (e.g., at intervals of 1 s) such that these pieces of information are associated with the delivery worker ID. The current time information includes not only the time but also the year, month, day, and the like.

The positions of the delivery workers A and B or vehicles 6A and 6B change from moment to moment. For this reason, when current location information is acquired at predetermined time intervals, the location obtained from the latest current location information and the actual location may not exactly match each other. However, the deviation is small and therefore the location obtained from current location information acquired at predetermined time intervals can be considered as the current location. Multiple pieces of information, such as information on the current location of the delivery worker A or B or vehicle 6A or 6B acquired at predetermined time intervals and current time information, may be collectively transmitted at once (so-called "burst transmission"). The time intervals at which information on the current location of the delivery worker or vehicle, and the like are acquired (e.g., intervals of 1 s), the number of pieces of information transmitted at once when burst-transmitting multiple pieces of information collectively, or the like may be previously set.

<Management Server 2>

Next, the management server 2 will be described. While, in the present embodiment, the management server 2 will be described as a single server having various functions, it may be a distributed server consisting of servers having different functions or may be realized by a cloud server (virtual server).

Figure 3:
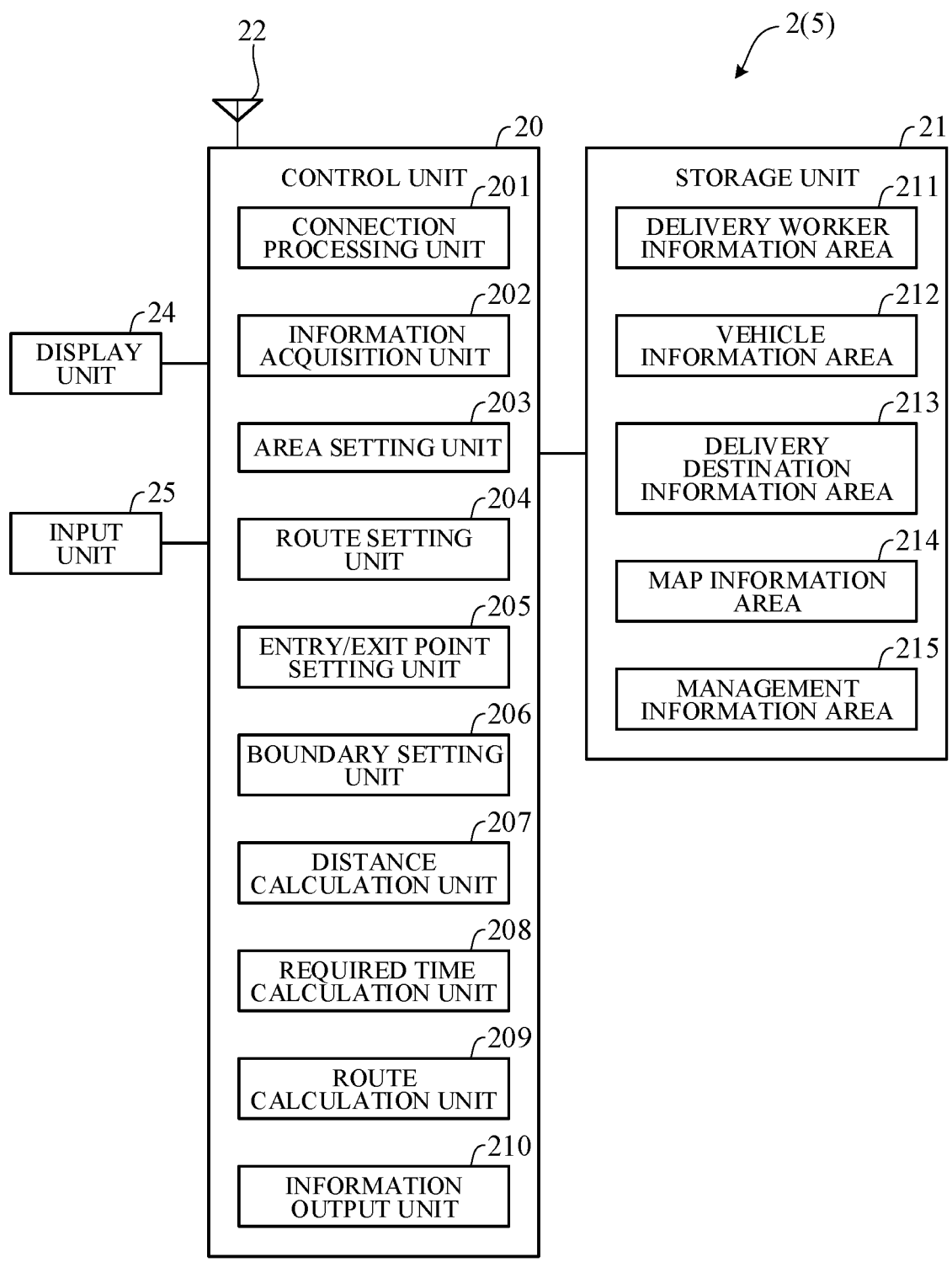
FIG. 3 is a block diagram showing a schematic configuration of a management server in FIG. 1.

FIG. 3 is a block diagram showing a schematic configuration of the management server 2. As shown in FIG. 3, the management server 2 includes a control unit 20, a storage unit 21, a communication unit 22, a display unit 24, and an input unit 25. The display unit 24 and input unit 25 may be omitted or may consist of other information terminals (not shown) connected to the management server 2.

The storage unit 21 consists of a semiconductor memory, hard disk drive, or the like. The storage unit 21 stores software, such as an operating system (OS) and applications, and other various types of information. For this reason, various storage areas, such as a delivery worker information area 211, a vehicle information area 212, a delivery destination information area 213, a map information area 214, and a management information area 215, are ensured in the storage unit 21. An information area is, for example, a table in a database management system, or the like.

The delivery worker information area 211 is an information area in which delivery worker information used to manage each delivery worker, such as the name of the delivery worker and the ID of the center to which the delivery worker belongs, is stored so as to be associated with the employee ID of the delivery worker (also referred to as the delivery worker ID), which is identification information of the delivery worker. A vehicle ID, which is identification information of a vehicle used by each delivery worker, that is, the vehicle 6A or 6B, is also stored in the delivery worker information area 211 so as to be associated with the delivery worker ID. For example, the manager of the distribution center sets the association of the vehicle IDs with the delivery worker IDs before daily delivery work is started.

The vehicle information area 212 is an information area in which information on each vehicle, including the vehicle type, such as four-wheeled vehicle, motorcycle, or bicycle, and the size of the cargo room, is stored so as to be associated with the vehicle ID.

The delivery destination information area 213 is an information area storing delivery destination information, such as the addresses (latitudes, longitudes) and phone numbers of the delivery destinations, work areas including the delivery destinations, and the delivery workers A and B in charge of the work areas including the delivery destinations. The work areas are areas previously set by the manager of the distribution center to assign delivery work to the delivery workers. For example, each work area corresponds to one or more city work areas and consists of delivery destinations consisting of 10 to 30 households. The delivery workers A and B are in charge of assigned areas each consisting of multiple work areas.

The map information area 214 is an information area in which map information of road maps, residential maps and the like is previously stored. The map information includes road link information, map data for displaying the background, such as roads and road maps, and the like. Such map information is updated periodically.

The management information area 215 stores information on scheduled routes previously set by the manager of the distribution center, information on the time-series locations of the delivery workers A and B or vehicles 6A and 6B acquired from the delivery worker terminals 1A and 1B, and information on the locations of boundary points between the work areas.

Figure 4A:
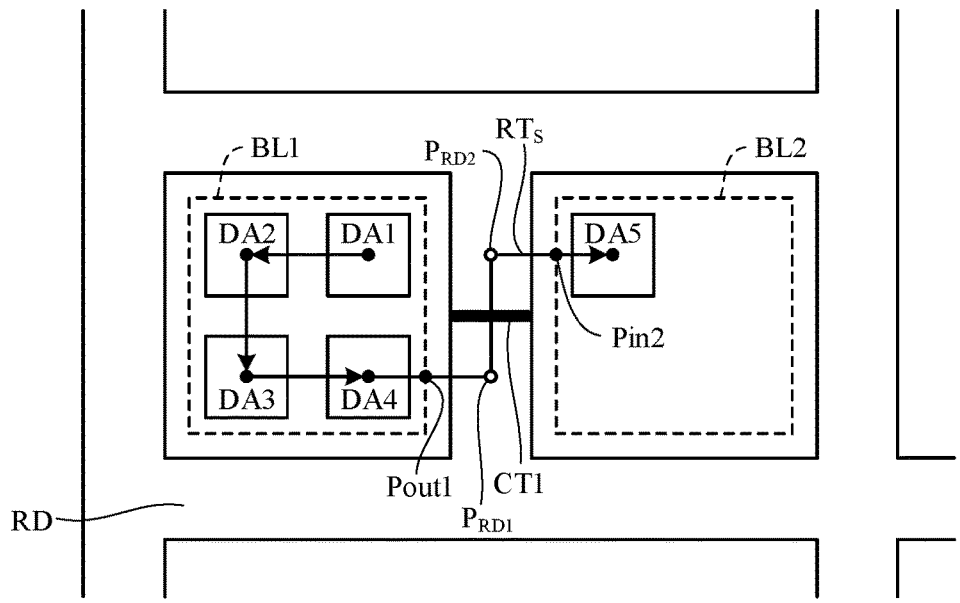
FIG. 4A is a diagram showing an example of a scheduled route stored in a management information area in FIG. 3.
Figure 4B:
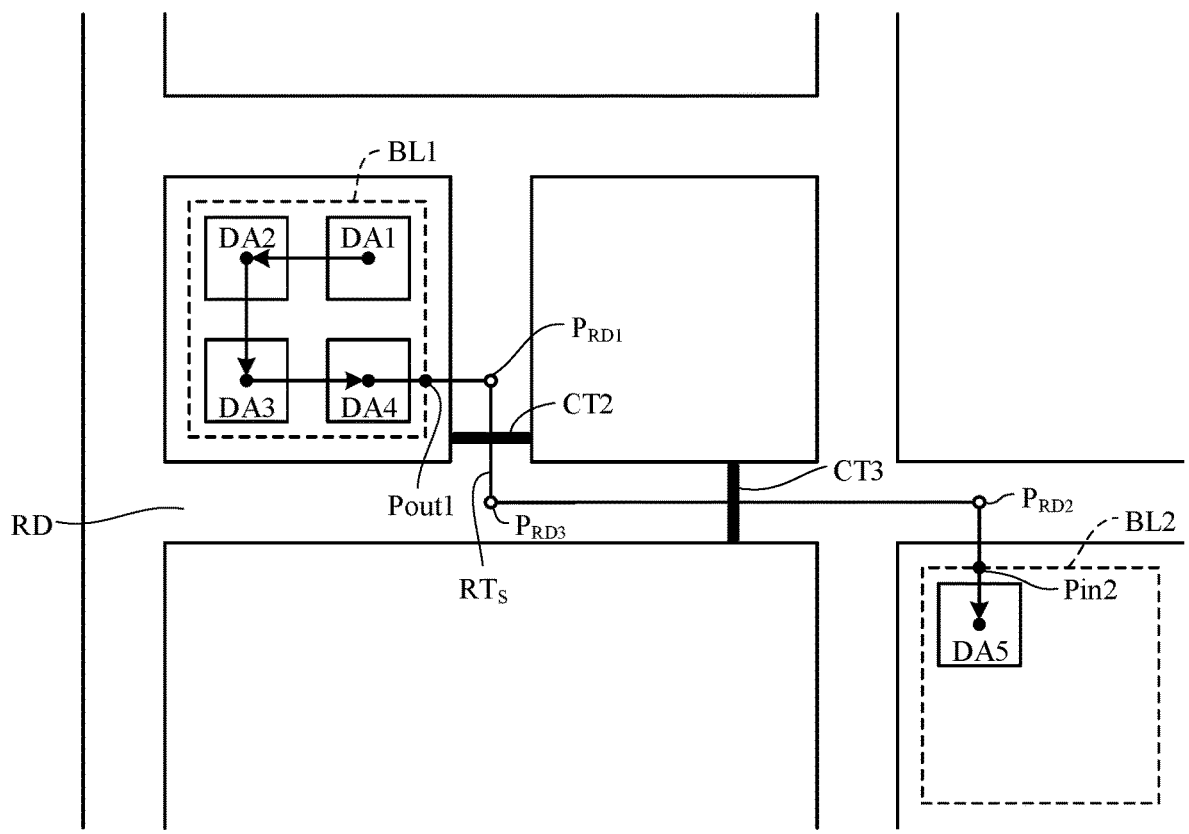
FIG. 4B is a diagram showing another example of the scheduled route stored in the management information area in FIG. 3.

FIGS. 4A and 4B are drawings showing examples of the scheduled routes stored in the management information area 215. The manager of the distribution center previously classifies all (five in FIGS. 4A and 4B) delivery destinations DA1 to DA5 managed by the manager at the distribution center into, for example, multiple (two in FIGS. 4A and 4B) work areas BL1 and BL2 that each consist of a block, street number, large apartment building, or the like. The manager also assigns the delivery workers A and B to the work areas BL1 and BL2, respectively. The manager also sets the order of delivery between the work areas (BL1→BL2 in FIGS. 4A and 4B) and the order of delivery among the delivery destinations (DA1→DA2 and the like in FIGS. 4A and 4B) in each work area, including the first delivery destinations (DA1, DA5) and the last delivery destination (DA4). Specifically, the manager sets, through the manager terminal 3, the work area numbers BL1 and BL2, the delivery workers A and B, and the order of delivery as information on the scheduled route associated with the addresses (latitude, longitude) of the delivery destinations DA1 to DA5. The scheduled route information set through the manager terminal 3 is transmitted to the management server 2 and stored in the management information area 215.

The communication unit 22 implements a communication protocol enabling wireless communication, such as 3G, LTE, 4G, or 5G, to communicate with the delivery worker terminals 1A and 1B. On the other hand, the communication unit 22 implements a communication protocol enabling wired communication (e.g., Internet line or the like) or wireless communication to communicate with the manager terminal 3.

The control unit 20 includes a processor including a CPU, RAM, ROM, I/O, and the like. The control unit 20 includes, as functional elements, a connection processing unit 201, an information acquisition unit 202, an area setting unit 203, a route setting unit 204, an entry/exit point setting unit 205, a boundary setting unit 206, a distance calculation unit 207, a required time calculation unit 208, a route calculation unit 209, and an information output unit 210.

The connection processing unit 201 processes login from the delivery worker terminal 1A or 1B and connects the delivery worker terminal 1A or 1B to the management server 2. The connection processing unit 201 also processes logout from the delivery worker terminal 1A or 1B and completes the connection between the delivery worker terminal 1A or 1B and the management server 2. The connection processing unit 201 also processes login from the manager terminal 3 and connects the manager terminal 3 to the management server 2, as well as processes logout from the manager terminal 3 and completes the connection between the manager terminal 3 and management server 2.

The information acquisition unit 202 acquires various types of information by receiving data transmitted from the delivery worker terminals 1A and 1B to the management server 2 and data transmitted from the manager terminal 3 to the management server 2, through the communication unit 22. The information acquired by the information acquisition unit 202 includes information on the locations of the vehicles 6A and 6B transmitted from the location information notification units 103 of the delivery worker terminals 1A and 1B and time information corresponding to the location information, information on the scheduled routes transmitted from the manager terminal 3, and the like. Specifically, the location information is represented by the latitude and longitude.

The area setting unit 203 sets the work areas BL1 and BL2 as areas on a map on the basis of map information stored in the map information area 214 and the scheduled route information stored in the management information area 215. As shown in FIGS. 4A and 4B, the work area BL1 including the delivery destinations DA1 to DA4 is set as, for example, an area inside a boundary line away from the delivery destinations DA1 to DA4 toward a road RD by a predetermined distance (e.g., 5 m). Area location information indicating the work areas BL1 and BL2 set by the area setting unit 203 is also stored in the management information area 215 as scheduled route information.

The route setting unit 204 sets a scheduled route RTS as a polyline along the road RD on the map on the basis of the map information stored in the map information area 214 and the scheduled route information stored in the management information area 215. As shown in FIGS. 4A and 4B, the scheduled route RTS is set as a polyline that passes through the delivery destinations DA1 to DA5 in the order of delivery. For example, in the work area BL1, the scheduled route RTS passes through the delivery destinations DA1 to DA4 in the order of delivery, that is, first passes through the delivery destination DA1 and lastly passes through the delivery destination DA4. Subsequently, the scheduled route RTS reaches a point on the road RD, for example, a point PRD1 on the road RD closest to the delivery destination DA4, before reaching the next work area BL2. The scheduled route RTS further reaches a point PRD2 on the road RD closest to the first delivery destination DA5 in the next work area BL2 and then reaches the first delivery destination DA5 in the work area BL2. Thus, in FIG. 4A, a polyline having DA1, DA2, DA3, DA4, PRD1, PRD2, and DA5 as vertexes is set as the scheduled route RTS.

If a scheduled route RTS has to turn right or left in the middle of extending from a point PRD1 to a point PRD2 as shown in FIG. 4B, it is set so as to pass through, for example, the center point PRD3 of an intersection. Thus, in FIG. 4B, a polyline having DA1, DA2, DA3, DA4, PRD1, PRD3, PRD2, and DA5 as vertexes is set as the scheduled route RTS. Information on the location of the polyline representing the scheduled route RTS set by the route setting unit 204 is also stored in the management information area 215 as scheduled route information.

The entry/exit point setting unit 205 sets the entry point and exit point of the scheduled route RTS in the work areas BL1 and BL2 on the map on the basis of the scheduled route information stored in the management information area 215. For example, as shown in FIGS. 4A and 4B, the entry/exit point setting unit 205 sets the exit point Pout1 of the scheduled route RTS in the work area BL1 and the entry point Pin2 of the scheduled route RTS in the work area BL2. The exit point Pout1 of the scheduled route RTS in the work area BL1 is set as the point of intersection of the scheduled route RTS and the boundary line defining the work area BL1. Similarly, the entry point Pin2 of the scheduled route RTS in the work area BL2 is set as the point of intersection of the scheduled route RTS and a boundary line defining the work area BL2. Information on the locations of the exit point Pout1 and entry point Pin2 set by the entry/exit point setting unit 205 is also stored in the management information area 215 as scheduled route information.

The boundary setting unit 206 sets a boundary point (boundary line) between the work area BL1 and work area BL2 continuous on the map in the order of delivery on the basis of the scheduled route information stored in the management information area 215. For example, if the length of the polyline from the exit point Pout1 of the preceding work area BL1 to the entry point Pin2 of the following work area BL2 (Pout1-PRD1-PRD2-Pin2 in FIG. 4A) is less than a predetermined distance L1 (e.g., 100 m) as shown in FIG. 4A, the boundary setting unit 206 sets a boundary line CT having a predetermined length L2 (e.g., 40 m) that intersects, for example, perpendicularly intersects, the midpoint of the longest segment (a segment RD1-PRD2 in FIG. 4A) among segments forming the polyline. A boundary line CT may be set at the midpoint of the entire polyline from the exit point Pout1 of the preceding work area BL1 to the entry point Pin2 of the following work area BL2.

On the other hand, if the length of the polyline from the exit point Pout1 of the preceding work area BL1 to the entry point Pin2 of the following work area BL2 (Pout1-PRD1-PRD2-Pin2 in FIG. 4B) is equal to or more than the predetermined distance L1 as shown in FIG. 4B, the boundary setting unit 206 sets a boundary line CT that perpendicularly intersects the midpoint of the first segment behind the exit point Pout1 of the preceding work area BL1 (a segment PRD1-PRD3 in FIG. 4B). The boundary setting unit 206 also sets a boundary line CT that perpendicularly intersects the midpoint of the last segment before the entry point Pin2 of the following work area BL2 (a segment PRD3-PRD2 in FIG. 4B).

The predetermined length L2 of the boundary line CT may be changed in accordance with the width of the road RD, or the like. The segments forming the polyline are not limited to straight-line segments and may be curve segments. When setting a boundary line CT on a curve segment, the boundary line CT is set so as to perpendicularly intersect a tangent line to the curve segment having the midpoint of the curve segment as the point of tangency. Information on the locations of the multiple boundary lines CT set by the boundary setting unit 206 is stored in the management information area 215 as information on the locations of the boundary points between the work areas BL1 and BL2.

FIGS. 5A to 5F are drawings showing setting of sections corresponding to the work areas by the boundary setting unit 206. FIGS. 5A to 5F show examples of scheduled routes RTS passing through three work areas BL1 to BL3 continuous in the order of delivery and having the distribution center or the like as the start point PS and the end point PE. Each scheduled route RTS is divided into work sections SCT1 to SCT3 corresponding to the work areas BL1 to BL3 by multiple boundary lines CT set before and behind the work areas BL1 to BL3. In the example in FIG. 5A, the work section SCT2 of the scheduled route RTS corresponding to the work area BL2 is defined by the boundary lines CT set before and behind the work area BL2. The boundary line CT before the work area BL2 is set on a portion of the scheduled route RTS from the exit point Pout1 of the preceding work area BL1 to the entry point Pin2 of the work area BL2. The boundary line CT behind the work area BL2 is set on a portion of the scheduled route RTS from the exit point Pout2 of the work area BL2 to the entry point Pin3 of the following work area BL3.

Figure 5A:
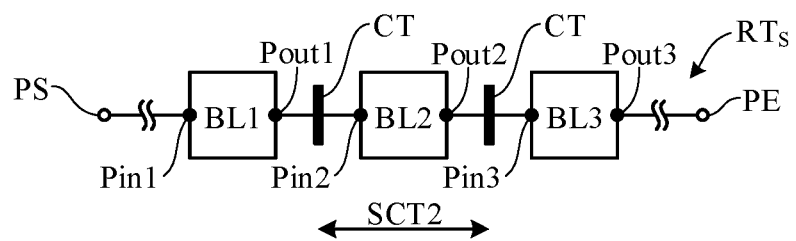
FIG. 5A is a diagram showing setting of sections by a boundary setting unit in FIG. 3.
Figure 5B:
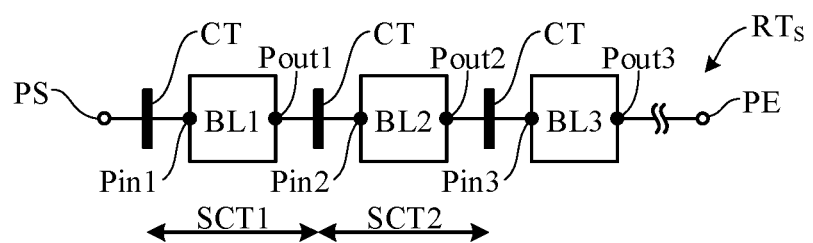
FIG. 5B is a diagram showing setting of a section following a start point of the scheduled route.

Similarly, in the example in FIG. 5B, the section SCT1 corresponding to the work area work area BL1 following the start point PS of the scheduled route RTS is defined by the boundary lines CT set before and behind the work area BL1. In this case, the boundary line CT before the work area BL1 is set on a portion of the scheduled route RTS from the start point PS to the entry point Pin1 of the work area BL1. In the example in FIG. 5C, the section SCT3 corresponding to the work area BL3 preceding the end point PE of the scheduled route RTS is defined by the boundary lines CT set before and behind the work area BL3. In this case, the boundary line CT following the work area BL3 is set on a portion of the scheduled route RTS from the exit point Pout3 of the work area BL3 to the end point PE.

As described above, if the length of the distance of a portion of the scheduled route RTS between work areas continuous in the order of delivery is equal to or more than the predetermined distance L1, two boundary lines CT are set between the work areas. In the example in FIG. 5D, the length of the distance (polyline) from the exit point Pout1 of the preceding work area BL1 to the entry point Pin2 of the following work area BL2 is equal to or more than the predetermined distance L1. Accordingly, two boundary lines CT are set on a portion of the scheduled route RTS between the work area BL1 and work area BL2. In this case, a portion of the scheduled route RTS extending to the boundary line CT following the work area BL1 is defined as the section SCT1 corresponding to the work area BL1, and a portion of the scheduled route RTS extending from the boundary line CT preceding the work area BL2 is defined as the work section SCT2 corresponding to the work area BL2. Also, a portion of the scheduled route RTS from the boundary line CT following the work area BL1 to the boundary line CT preceding the work area BL2 is defined as a travel section SCTBA that corresponds to a non-work area BA and is located between the work areas.

Figure 5C:
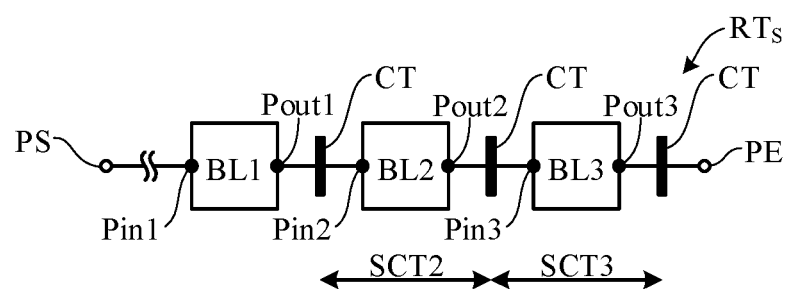
FIG. 5C is a diagram showing setting of a section preceding an end point of the scheduled route.
Figure 5D:
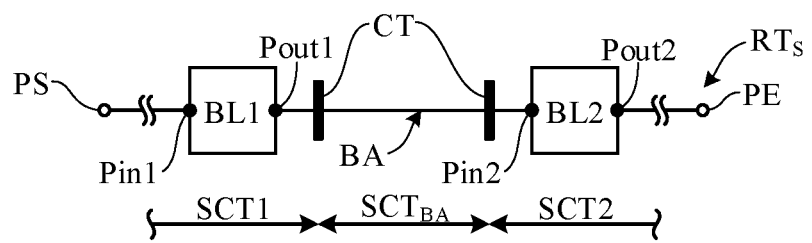
FIG. 5D is a diagram showing setting of sections when work areas away from each other.
Figure 5E:
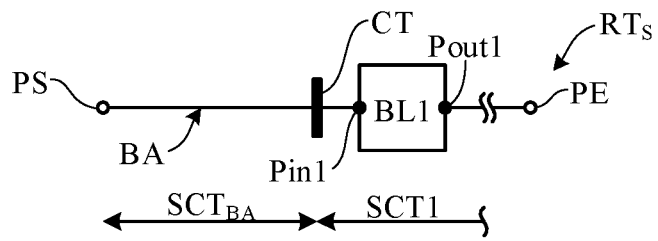
FIG. 5E is a diagram showing setting of sections when the start point of the scheduled route and the work area away from each other.

The example in FIG. 5E represents a case in which the length of the distance (polyline) from the start point PS of the scheduled route RTS to the entry point Pin1 of the following work area BL1 is equal to or more than the predetermined distance L1. In this case, the boundary setting unit 206 sets a boundary line CT that perpendicularly intersect the midpoint of the last segment before the entry point Pin1 of the work area BL1 among the segments forming the polyline. A portion of the scheduled route RTS from the start point PS to the boundary line CT preceding the work area BL1 is defined as a travel section SCTBA that corresponds to a non-work area BA and is located between the distribution center and the work area.

Figure 5F:
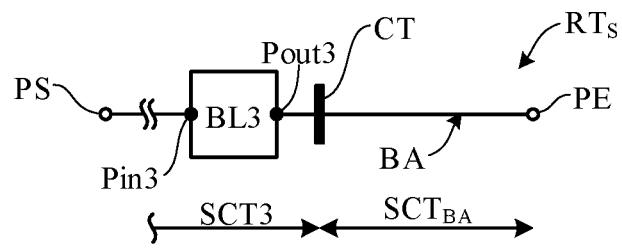
FIG. 5F is a diagram showing setting of sections when the work area and the end point of the scheduled route away from each other.

In the example in FIG. 5F, the length of the polyline from the exit point Pout3 of the work area BL3 preceding the end point PE of the scheduled route RTS to the end point PE is equal to or more than the predetermined distance L1. Accordingly, the boundary setting unit 206 sets a boundary line CT that perpendicularly intersects the midpoint of the first segment behind the exit point Pout3 of the work area BL3. In this case, a portion of the scheduled route RTS from the boundary line CT following the work area BL3 to the end point PE is defined as a travel section SCTBA that corresponds to a non-work area BA and is located between the work area and the distribution center.

The distance calculation unit 207 calculates the lengths of the distances (polylines) of the work sections SCT1 to SCT3 and the travel sections SCTBA of the scheduled route RTS on the basis of the scheduled route information and information on the locations of the boundary points stored in the management information area 215. The lengths of the distances of the work sections SCT1 to SCT3 and the travel sections SCTBA of the scheduled route RTS calculated by the distance calculation unit 207 are stored in the management information area 215 as scheduled route information.

The required time calculation unit 208 calculates the required times for the work sections SCT1 to SCT3 and the travel sections SCTBA on the basis of the lengths of the respective distances of the scheduled route RTS calculated by the distance calculation unit 207 and a preset scheduled travel speed. The scheduled travel speed is set to, for example, about 10 km/h in accordance with details of work in the work areas or the traffic situation around the work areas. The scheduled travel speed may be set for each work area considering the size of apartment buildings containing the delivery destinations in the work area, the traffic situation around the work area, or the like. The scheduled travel speed may also be set on each delivery worker considering travel means used by the delivery worker, the worker's proficiency in delivery work, or the like. The required times for the work sections SCT1 to SCT3 and travel sections SCTBA calculated by the required time calculation unit 208 are stored in the management information area 215 as scheduled route information.

The route calculation unit 209 calculates the actual routes on which the delivery workers A and B have actually traveled, on the basis of information on the time-series locations of the delivery workers A and B or vehicles 6A and 6B stored in the management information area 215.

Figure 6:
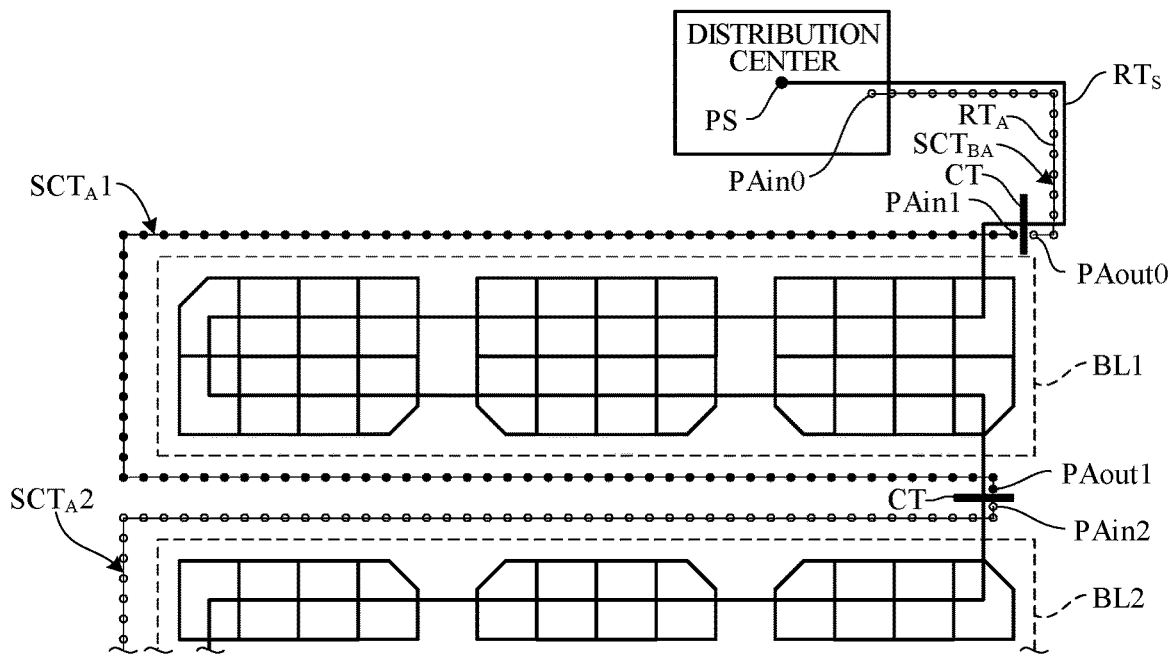
FIG. 6 is a diagram showing an example of an actual route calculated by a route calculation unit in FIG. 3.

FIG. 6 is a drawing showing an example of an actual route RTA calculated by the route calculation unit 209 and shows the locations of one of the delivery workers A and B, for example, the delivery worker A, corresponding to predetermined times using plotted points. As shown in FIG. 6, the actual route RTA of the delivery worker A is calculated as a route obtained by connecting plotted points corresponding to the locations of the delivery worker A on a time-series basis. Specifically, for example, the actual route RTA is calculated as a polyline obtained by connecting plotted points adjacent to each other on a time-series basis in a straight line.

The required time calculation unit 208 calculates the required times for the work sections SCT1 to SCT3 and the travel sections SCTBA of the actual route RTA on the basis of information on the time-series locations of the delivery workers A and B or vehicles 6A and 6B stored in the management information area 215 and information on the locations of the boundary points between the work areas. Specifically, as shown in FIG. 6, the required time calculation unit 208 selects plotted points PAin1 and PAin2 immediately behind multiple (two in FIG. 6) boundary lines CT from among time-series multiple plotted points forming the actual route RTA as the start points of the following work sections SCTA1 and SCTA2, respectively, of the actual route RTA. The required time calculation unit 208 also selects plotted points PAout0 and PAout1 immediately before the multiple boundary lines CT as the ends point of the preceding travel section SCTBA and work section SCTA1, respectively, of the actual route RTA.

Figure 7:
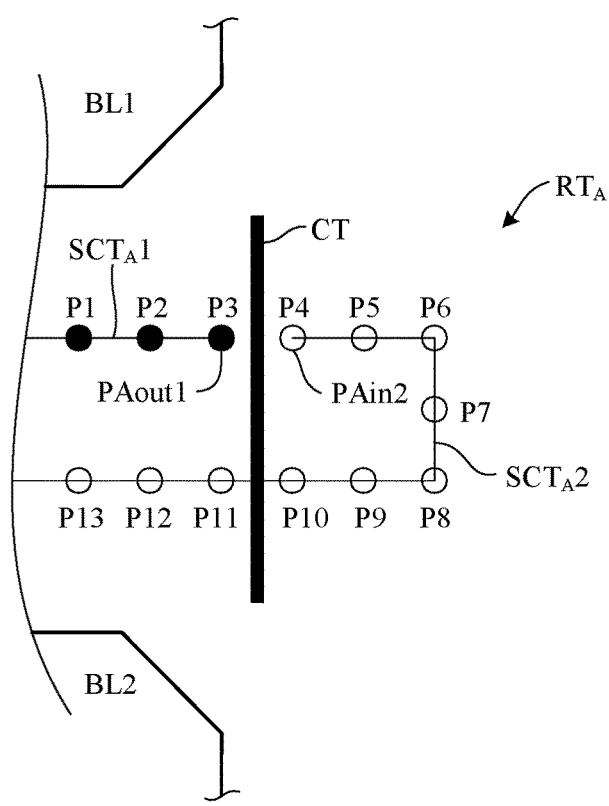
FIG. 7 is a drawing showing selection of the start points and the end points of the sections of the actual route by a required time calculation unit in FIG. 3.

FIG. 7 is a drawing showing selection of the start points and end points of the sections of the actual route RTA by the required time calculation unit 208 and shows the time-series locations of the delivery worker A or B as plotted points P1 to P13. It is assumed that a boundary line CT in FIG. 7 specifies the end point of the work section SCT1 and the start point of the work section SCT2. As shown in FIG. 7, when the delivery worker A or B makes a round trip on the same place, for example, on the same road, the actual route RTA may pass through the boundary line CT multiple times. Specifically, the actual route RTA including the plotted points P1 to P13 first passes through the boundary line CT between the plotted point P3 and plotted point P4 and then again passes through the boundary line CT between the plotted point P10 and plotted point P11.

Figures 8, 9:
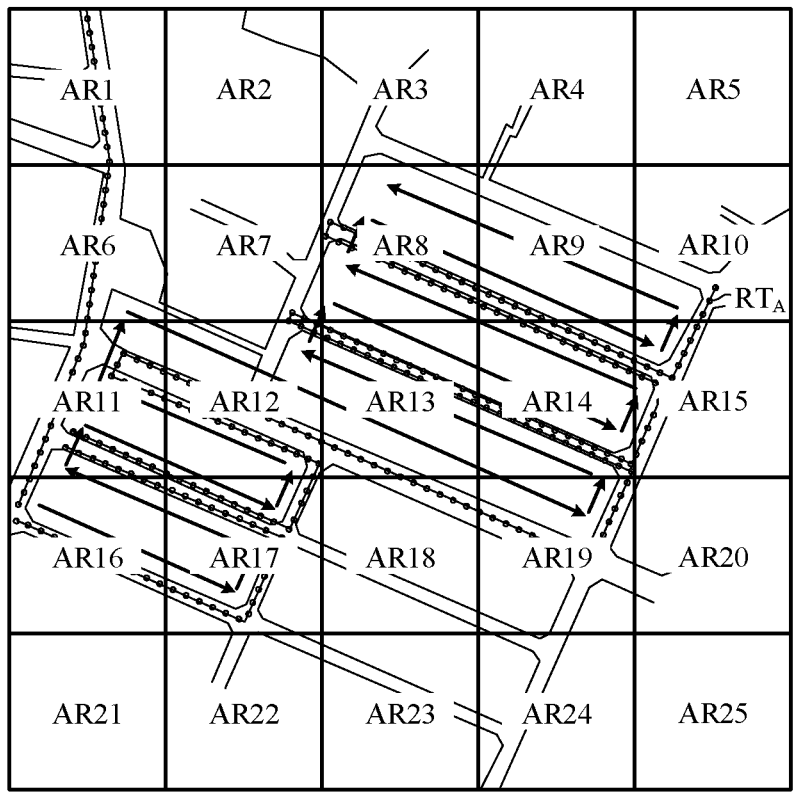
FIG. 8 is a drawing showing a comparative example in which the actual route is divided using mesh areas.
FIG. 9 is a diagram showing an example of route evaluation information outputted from an information output unit in FIG. 3.

In this case, the actual route RTA is divided into the work sections SCT1 and SCT2 between the plotted points P3 and P4, between which the actual route RTA first passes through the boundary line CT on a time-series basis. Specifically, the plotted point P3 is selected as the plotted point PAout1 immediately before the boundary line CT (as the end point of the work section SCT1), and the plotted point P4 is selected as the plotted point PAin2 immediately behind the boundary line CT (as the start point of the work section SCT2 following the work section SCT1). Accordingly, even if the actual route RTA makes a round trip on the same place, the manager is able to divide the actual route RTA into multiple sections in the order of passage on a time-series basis. Note that, for example, a technique of dividing the actual route RTA using mesh areas AR1 to AR25 corresponding to the latitude and longitude, as shown in FIG. 8, is also conceivable. However, such a technique has difficulty in dividing the actual route RTA into multiple sections in the order of passage on a time-series basis.

When the start points and end points of the respective sections are selected, those sections of the actual route RTA are confirmed. Specifically, the section from the plotted point PAin0, which is the start point of the actual route RTA, to the plotted point PAout0 is confirmed as the travel section SCTBA corresponding to the non-work area BA on the actual route RTA and extending from the distribution center to the work area BL1. Also, the section from the plotted point PAin1 to the plotted point PAout1 is confirmed as the work section SCTA1 corresponding to the work area BL1 on the actual route RTA. Also, a portion of the actual route RTA behind the plotted point PAin2 is defined as the work section SCTA2 corresponding to the work area BL2.

When those sections of the actual route RTA are confirmed, the required time calculation unit 208 calculates the required times for the respective sections. Specifically, the required time calculation unit 208 calculates the time required to pass through the travel section SCTBA on the basis of information on the times of the plotted points PAin0 and PAout0 and calculates the time required to pass through the work section SCTB1 on the basis of information on the times of the plotted points PAin1 and PAout1. The required times for the work sections SCT1 to SCT3 and travel sections SCTBA of the actual route RTA calculated by the required time calculation unit 208 are transmitted to the manager terminal 3 of the distribution center as route evaluation information. The manager of the distribution center is able to evaluate the travel route of the delivery worker by checking the required times for the respective sections through the manager terminal 3.

The information output unit 210 outputs various types of information by transmitting data from the management server 2 to the manager terminal 3 through the communication unit 22. The information outputted from the information output unit 210 to the manager terminal 3 includes the required times for the respective sections, and the like.

FIG. 9 is a diagram showing an example of route evaluation information outputted from the information output unit 210. As shown in FIG. 9, the route evaluation information includes the required times for the respective sections of the actual route RTA (actual required times), the required times for the respective sections of the scheduled route RTS (scheduled required times) stored in the management information area 215, and the differences between the actual required times and scheduled required times. By checking there pieces of information through the manager terminal 3, the manager of the distribution center is able to, for example, reduce a work area where the actual required time is longer than the scheduled required time or expand a work area where the actual required time is shorter than the scheduled required time. By making adjustments to the work areas so that the required times for the respective work areas become uniform, the manager is able to assign balanced delivery workloads to the delivery workers A and B.

Figure 10:
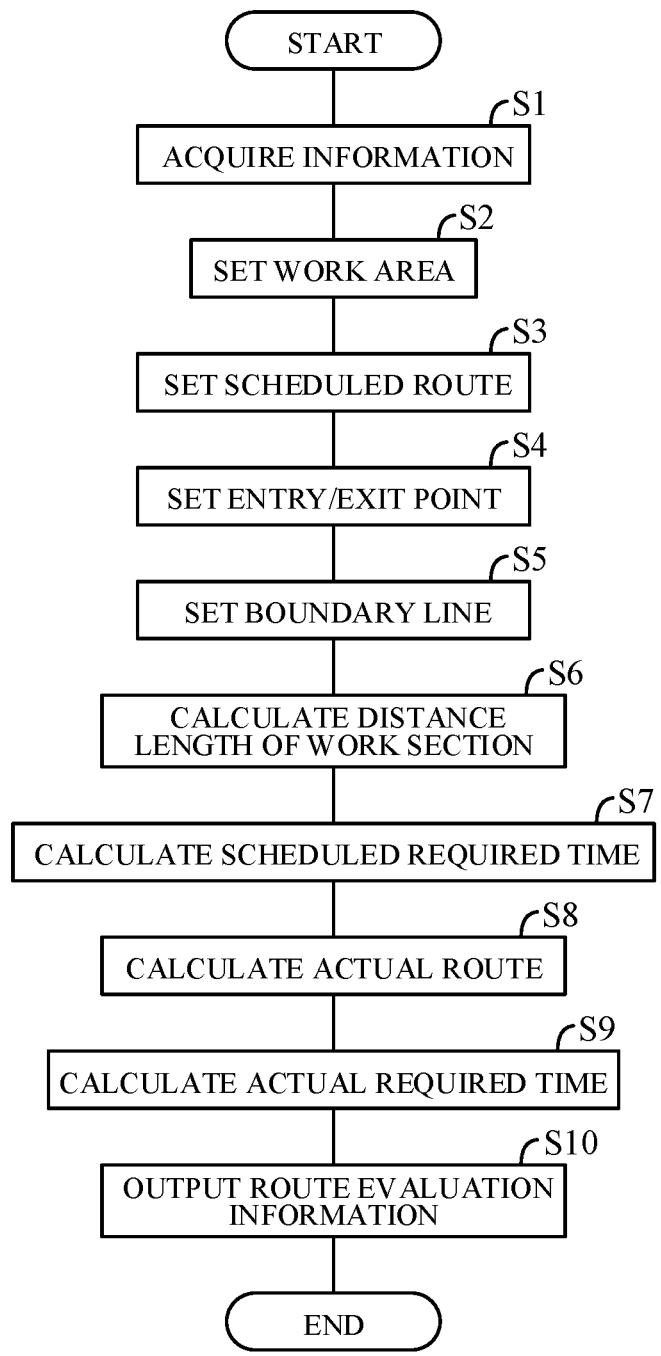
FIG. 10 is a flowchart showing an example of a process performed by the management server in FIG. 3.

FIG. 10 is a flowchart showing an example of a process performed by the CPU of the management server 2 in accordance with a previously stored program. The process shown by this flowchart is started, for example, when the management server 2 receives a route evaluation information output request from the manager terminal 3.

First, in step S1, the information acquisition unit 202 reads the route evaluation information output request received from the manager terminal 3 through the communication unit 22 and reads information on the scheduled route and information on the actual route (information on the time-series locations) with respect to the specified delivery worker A or B in a specified delivery period. The information acquisition unit 202 also reads map information stored in the map information area 214. Then, step S2, the area setting unit 203 sets multiple work areas BL1 to BL3 on a map on the basis of the scheduled route information and map information. Then, step S3, the route setting unit 204 sets a scheduled route RTS that passes through the work areas BL1 to BL3 set in step S2 in the order of delivery, on the basis of the scheduled route information and map information.

Then, in step S4, the entry/exit point setting unit 205 sets the entry points Pin1 to Pin3 and exit points Pout1 to Pout3 of the scheduled route RTS set in step S3, in the work areas BL1 to BL3 set in step S2 on the basis of the scheduled route information and map information. Then, in step S5, the boundary setting unit 206 sets multiple boundary lines CL between the work areas BL1 to BL3 set in step S2 and between the work areas BL1 to BL3 and the non-work areas BA on the basis of the scheduled route information. Then, in step S6, the distance calculation unit 207 calculates the lengths of the distances of the work sections SCT1 to SCT3 and travel sections SCTBA of the scheduled route RTS obtained by division by the multiple boundary lines CL set in step S5 on the basis of the scheduled route information and information on the locations of the boundary points. Then, in step S7, the required time calculation unit 208 calculates the scheduled required times for the respective sections on the basis of the lengths of the distances of the scheduled route RTS calculated in step S3 and the preset scheduled travel speed.

Then, the process proceeds to step S8, and the route calculation unit 209 calculates the actual route RTA on which the delivery worker A or B specified in the route evaluation information output request has actually traveled, on the basis of information on the actual route (information on the time-series locations) of the specified delivery worker A or B. Then, in step S9, the required time calculation unit 208 calculates the actual required times for the actual work sections SCTA1 to SCTA3 and travel sections SCTBA of the actual route RTA on the basis of information on the locations of the boundary points set in step S5 and information on the actual route RTA calculated in step S8. Then, in step S10, the information output unit 210 transmits, to the manager terminal 3, route evaluation information including the scheduled required times and actual required times for the respective sections and the differences between the actual required times and scheduled required times.

The manager of the distribution center is able to evaluate the travel route of the delivery worker by checking the route evaluation information including the scheduled required times and actual required times for the sections through the manager terminal 3. Specifically, the manager is able to evaluate the travel route in terms of the required times for the respective sections. Thus, for example, the manager is able to periodically review the workloads in the work areas corresponding to the work sections and thus to assign balanced delivery workloads to the delivery workers A and B.

<Manager Terminal 3>

Next, the manager terminal 3 will be described. The manager of the distribution center uses the manager terminal 3 to set and evaluate the travel routes of the delivery workers A and B. The manager terminal 3 is any type of computer, such as a personal computer, tablet terminal, or smartphone, disposed in the distribution center and transmits and receives information to and from the management server 2 through the network 4.

Figure 11:
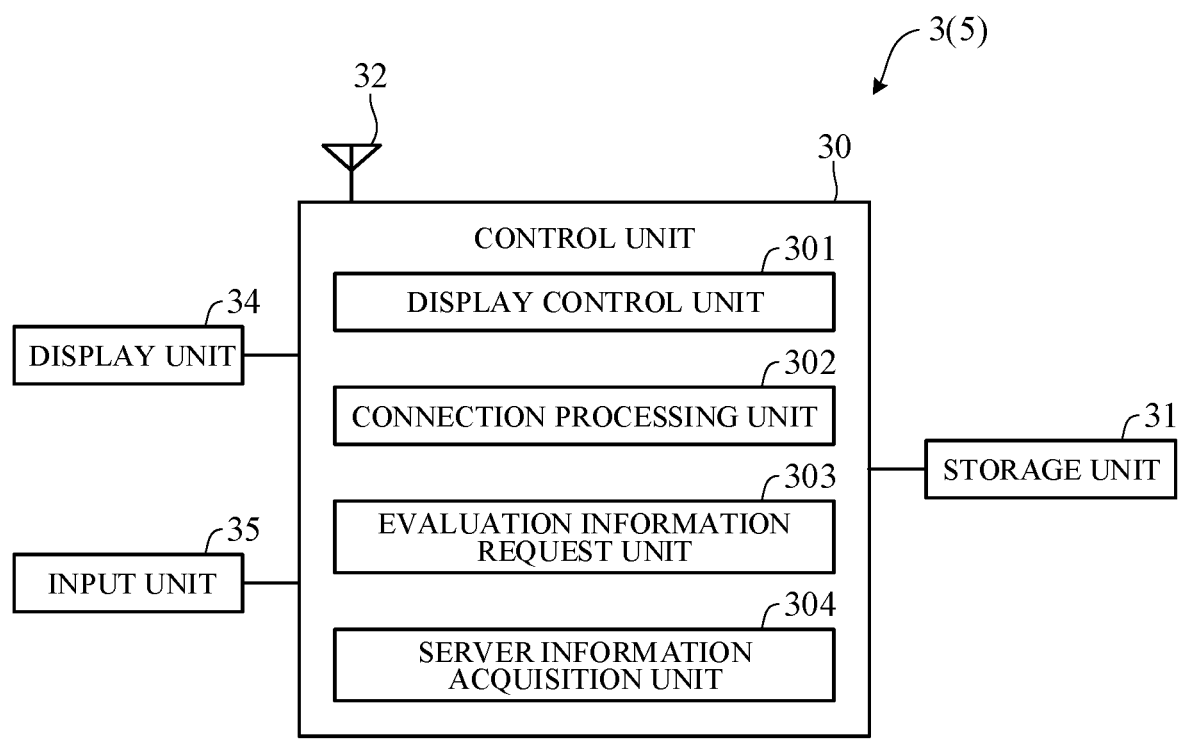
FIG. 11 is a block diagram showing a schematic configuration of a manager terminal in FIG. 1.

FIG. 11 is a block diagram showing a schematic configuration of the manager terminal 3. As shown in FIG. 11, the manager terminal 3 includes a control unit 30, a storage unit 31, a communication unit 32, a display unit 34, and an input unit 35.

The storage unit 31 consists of a semiconductor memory, hard disk drive, or the like. The storage unit 31 stores software, such as an operating system (OS) and applications, and other various types of information.

The communication unit 32 implements a communication protocol enabling wired communication (e.g., the Internet line or the like) or a communication protocol enabling wireless communication, such as 3G, LTE, 4G, or 5G, and is connected to the management server 2 to transmit and receive various types of data to and from the management server 2.

The display unit 34 consists of a display device, such as a liquid crystal display or organic EL panel. Upon receipt of an instruction from the control unit 30, the display unit 34 displays a map, a button icon for operating a touchscreen, or the like. The display unit 34 also displays route evaluation information or the like transmitted from the information output unit 207 of the management server 2.

The input unit 35 consists of physical switches, such as a numeric keypad, operated by the manager, an input device (not shown), such as a touchscreen, disposed so as to be overlaid on the display surface of the display unit 34, or the like. The manager inputs, through the input unit 35, a command to change the display screen of the display unit 34. Through the input unit 35, the manager is able to set the work areas BL1 and BL2 (classify the delivery destinations DA1 to DA5), assign the delivery workers A and B to each work areas, and set delivery order of the work areas BL1 and BL2 and delivery order of the delivery destinations DA1 to DA5 in each work area.

The control unit 30 includes a processor including a CPU, RAM, ROM, I/O, and the like. The control unit 30 includes, as functional elements, a display control unit 301, a connection processing unit 302, an evaluation information request unit 303, and a server information acquisition unit 304.

The display control unit 301 controls the screen display of the display unit 34 by generating image signals in accordance with an operation on the input unit 35 and transmitting the image signals to the display unit 34. Screens that the display control unit 301 causes the display unit 34 to display include a login screen for logging in to the management system 100, a setting screen for setting delivery order of the work areas BL1 and BL2, the delivery workers A and B assign to each work areas and delivery order of the delivery destinations DA1 to DA5 in each work area, a route evaluation screen for displaying route evaluation information (FIG. 9), and the like.

The connection processing unit 302 processes login to the management server 2 using, for example, an identification number for identifying the manager or responsible person of the distribution center (center manager ID) and a password.

The evaluation information request unit 303 specifies a delivery worker and a delivery period in accordance with an operation on the input unit 35 by the manager and transmits a route evaluation information output request to the management server 2.

The server information acquisition unit 304 acquires route evaluation information or the like transmitted from the management server 2 (information output unit 210). Thus, the route evaluation information (FIG. 9) is displayed on the display unit 34.

[Operation of Management System 100]

Next, an example of the operation of the management system 100 will be described. For example, when departing from the distribution center, that is, when starting work, the delivery worker A who drives the vehicle 6A inputs his or her login ID and a password on the login screen displayed on the display unit 14 of the delivery worker terminal 1A through the input unit 15. Thus, the management server 2 processes connection from the delivery worker terminal 1A. Subsequently, the delivery worker terminal 1A communicates with the management server 2 at predetermined time intervals (e.g., at intervals of 1 s), for example, transmits information on the location of the delivery worker A or vehicle 6A to the management server 2. The communication between the delivery worker terminal 1A and management server 2 continues until the delivery worker terminal 1A logs out.

On the other hand, the manager of the distribution center inputs the center manager ID and a password on the login screen displayed on the display unit 34 of the manager terminal 3 through the input unit 35. Thus, the management server 2 processes connection from the manager terminal 3. When the manager specifies the delivery worker A and delivery period and inputs a route evaluate information output request through the input unit 35 (touchscreen), the route evaluation information output request is transmitted to the management server 2.

In response to the route evaluation information output request, the management server 2 sets multiple work areas BL1 to BL3 in which the delivery worker A has done delivery work in the delivery period specified in the request and sets a scheduled route RTS that passes through the work areas BL1 to BL3 in the order of delivery (steps S1 to S3). The management server 2 also sets the entry points Pin1 to Pin3 and exit points Pout1 to Pout3 of the scheduled route RTS in the work areas BL1 to BL3 and sets multiple boundary lines CL between the work areas BL1 to BL3 and between the work areas BL1 to BL3 and non-work areas BA (steps S4 and S5). The management server 2 also calculates the lengths of the distances of the work sections SCT1 to SCT3 and travel sections SCTBA of the scheduled route RTS obtained by division by the multiple boundary lines CL and calculates the scheduled required times for the respective sections (steps S6 and S7).

The management server 2 also calculates the actual route RTA along which the delivery worker A has actually traveled in the delivery period specified in the request and calculates the actual required times for the actual work sections SCT1 to SCT3 and travel sections SCTBA of the actual route RTA on the basis of information on the locations of the boundary points (steps S8 and S9). Information on the scheduled required times and actual required times for the sections calculated by the management server 2 is transmitted to the manager terminal 3 as route evaluation information and displayed on the display unit 34 (step S10).

The manager of the distribution center is able to evaluate the travel route of the delivery worker by checking the route evaluation information including the scheduled required times and actual required times for the sections through the manager terminal 3. Thus, the manager is able to review the workloads in the work areas corresponding to the work sections when necessary and thus to assign balanced delivery workloads to the delivery workers. For example, if it is considered that the actual required time has become longer or shorter than the scheduled required time due to an increase or reduction in the number of delivery destinations included in each work area, a change in the surrounding traffic situation, or the like, the manager is able to review the range of the work area.

The present embodiment can achieve advantages and effects such as the following:

(1) The route subdivision apparatus 5 is configured to subdivide the travel route for conducting work. The route subdivision apparatus 5 includes: the area setting unit 203 configured to set work areas on a map; the route setting unit 204 configured to set the scheduled route RTS from the start point PS to the end point PE so that the scheduled route RTS passes through consecutive work areas BL1 to BL3 of the work areas; the entry/exit point setting unit 205 configured to set the entry point Pin1 to Pin3 and the exit point Pout1 to Pout3 of the scheduled route RTS set by the route setting unit 204 in each work area of the work areas; the boundary setting unit 206 configured to set the boundary line CT between the exit point Pout1 of the work area BL1 and the entry point Pin2 of the work area BL2 and between the exit point Pout2 of the work area BL2 and the entry point Pin3 of the work area BL3; and the distance calculation unit 207 configured to calculate the length of the distance of each work section SCT2 divided by the boundary lines CT set by the boundary setting unit 206 on the scheduled route RTS (FIG. 3).

Thus, the route subdivision apparatus 5 is able to subdivide the travel route of the delivery worker who works while traveling on multiple work areas, into short sections corresponding to the work areas. Specifically, the route subdivision apparatus 5 is able to automatically subdivide the scheduled route RTS on the basis of information on the order of delivery including the first delivery destinations (DA1, DA5) and last delivery destination (DA4) in the work areas BL1 and BL2, previously set so as to be associated with the addresses (latitude, longitude) of the delivery destinations (information on the scheduled route) (FIGS. 4A to 5F).

(2) The route subdivision apparatus 5 includes: the required time calculation unit 208 configured to calculate the required time for passing through the length of the distance based on the length of the distance calculated by the distance calculation unit 207 and a predetermined scheduled travel speed (FIG. 3). Thus, the manager is able to evaluate the travel route of the delivery worker who works while traveling on the multiple work areas, in terms of the required times for the short sections corresponding to the work areas.

(3) The route setting unit 204 sets the scheduled route RTS so that the scheduled route RTS passes through the start point PS and then the work area BL1 (FIG. 5B, FIG. 5E). The boundary setting unit 206 sets the boundary line CT between the start point PS and the entry point Pin1 of the work area BL1 (FIG. 5B, FIG. 5E). Thus, the route subdivision apparatus 5 is able to properly set a section corresponding to the first work area on the travel route.

(4) The route setting unit 204 sets the scheduled route RTS so that the scheduled route RTS passes through the work area BL3 and then the end point PE (FIG. 5C, FIG. 5F). The boundary setting unit 206 sets the boundary line CT between the exit point Pout3 of the work area BL3 and the end point PE (FIG. 5C, FIG. 5F). Thus, the route subdivision apparatus 5 is able to properly set a section corresponding to the last work area on the travel route.

(5) The area setting unit 203 sets the non-work area BA between the work area BL1 and the work area BL2 or between the work area BL2 and the work area BL3 (FIG. 5D). The boundary setting unit 206 sets the boundary line CT between the work area BL1 or the work area BL2 immediately before the non-work area BA and the non-work area BA, and between the non-work area BA and the work area BL2 or the work area BL3 immediately behind the non-work area BA (FIG. 5D). Thus, even if non-work areas are present between the work areas on the travel route, the route subdivision apparatus 5 is able to properly set sections corresponding to the work areas.

(6) The area setting unit 203 sets the non-work area BA between the work area BL1 and the work area BL2 or between the work area BL2 and the work area BL3 when the length of the distance between the exit point Pout1 of the work area BL1 and the entry point Pin2 of the work area BL2 or between the exit point Pout2 of the work area BL2 and the entry point Pin3 of the work area BL3 on the scheduled route RTS is equal to or longer than the predetermined distance L1 (FIG. 5D). The boundary setting unit 206 sets the boundary line CT between the work area BL1 or the work area BL2 immediately before the non-work area BA and the non-work area BA and between the non-work area BA and the work area BL2 or the work area BL3 immediately behind the non-work area BA (FIG. 5D).

Thus, even if non-work areas BA are present between work areas on the travel route and the work areas are away from each other, the route subdivision apparatus 5 is able to subdivide the travel route by automatically distinguishing between the travel sections SCTBA between the work areas corresponding to the non-work areas BA and the sections SCT1 to SCT3 corresponding to the work areas (FIG. 5D).

(7) The area setting unit 203 sets the non-work area BA between the start point PS and the work area BL1 (FIG. 5E). The boundary setting unit 206 sets the boundary line CT between the start point PS and the non-work area BA and between the non-work area BA and the entry point Pin1 of the work area BL1 (FIG. 5E). Thus, even if a non-work area is present between the start point of the travel route and the first work area, that is, even if the start point and the first work area are away from each other, the route subdivision apparatus 5 is able to properly set a section corresponding to the first work area on the travel route.

(8) The area setting unit 203 sets the non-work area BA between the work area BL3 and the end point PE (FIG. 5F). The boundary setting unit 206 sets the boundary line CT between the exit point Pout3 of the work area BL3 and the non-work area BA and between the non-work area BA and the end point PE (FIG. 5F). Thus, even if a non-work area is present between the last work area on the travel route and the end point of the travel route, that is, even if the last work area and the end point are away from each other, the route subdivision apparatus 5 is able to properly set a section corresponding to the last work area on the travel route.

(9) The route subdivision apparatus 5 includes: the information acquisition unit 202 configured to acquire the location information of the worker A, B who conducts delivery work traveling on the work areas BL1 to BL3 and the time information corresponding to the location information; and the route calculation unit 209 configured to calculate the actual route RTA of the worker A, B based on the location information and the time information acquired by the information acquisition unit 202 (FIG. 3). The required time calculation unit 208 calculates the actual required time for passing through each work section SCT1 to SCT3 or each travel section SCTBA divided by the boundary lines CT set by the boundary setting unit 206 on the actual route RTA calculated by the route calculation unit 209 based on the time information acquired by the information acquisition unit 202. Thus, the manager is able to evaluate the travel route of the delivery worker who works while traveling on the multiple work areas, by making a comparison between the scheduled required times and actual required times for the sections corresponding to the work areas.

The above-mentioned embodiment can be modified into various forms. Hereafter, modifications will be described. While, in the above embodiment, an example in which the route subdivision apparatus 5 subdivides the travel routes of the delivery workers has been described, a route subdivision apparatus is not limited to this example as long as it subdivides the travel routes of workers in charge of work.

While, in the above embodiment, the route subdivision apparatus 5 subdivides travel routes for delivery work, a route subdivision apparatus can be configured otherwise so long as it divides a travel route for conducting work. For example, it may divide a travel route for conducting work such as equipment inspection work patrolling each house.

While, in the above embodiment, the area setting unit 203 sets the work area BL1 to BL3 as an area inside boundary line separated from each delivery destination by a predetermined distance on the side of the road RD, an area setting unit can be configured otherwise so long as it sets a plurality of work area on a map. For example, it may set a work area including facility or the like on the road.

While, in the above embodiment, the route setting unit 204 sets the scheduled route RTS as a polyline along the road RD on a map, a route setting unit can be configured otherwise so long as it sets a scheduled route passing through a plurality of work area.

While, in the above embodiment, the entry/exit point setting unit 205 sets the entry point and the exit point of the work area as intersections of the scheduled route RTS and the boundary line defining the work area, an entry/exit point setting unit can be configured otherwise so long as it sets an entry point and an exit point. For example, it may set the first work point in each work area as an entry point, and set the last work point as an exit point.

While, in the above embodiment, the boundary setting unit 206 sets the boundary line CT crossing (orthogonal to) the scheduled route RTS, a boundary setting unit can be configured otherwise so long as it set a boundary point. For example, it may set the entry point and the exit point of each work area as is, as a boundary point. Also, a boundary point is not limited to a boundary line; it can be set as a geofence or the like.

While, in the above embodiment, the information acquisition unit 202 acquires information on the locations calculated by the delivery worker terminals 1A and 1B, an information acquisition unit that acquires information on the locations of the workers may be configured otherwise. For example, the management server 2 may calculate the locations on the basis of GPS signals or the like received by the delivery worker terminals 1A and 1B.

While, in the above embodiment, the route calculation unit 209 calculates the actual route RTA as a polyline connecting plotted locational points by straight lines on a time-series basis, a route calculation unit can be configured otherwise so long as it calculates an actual route of a worker. For example, it may calculate an actual route based on the moving average of the plotted location points.

The above description is only an example, and the present invention is not limited to the above embodiment and modifications, unless impairing features of the present invention. The above embodiment can be combined as desired with one or more of the above modifications. The modifications can also be combined with one another.

REFERENCE SIGNS LIST 1A, 1B delivery worker terminal, 2 management server, 3 manager terminal, 4 network, 5 route subdivision apparatus, 6A, 6B vehicle, 10 control unit, 11 storage unit, 12 wireless unit, 13 sensor unit, 13a GPS sensor, 13b gyro sensor, display unit, 15 input unit, 20 control unit, 21 storage unit, 22 communication unit, 24 display unit, 25 input unit, 30 control unit, 31 storage unit, 32 communication unit, 34 display unit, 35 input unit, 100 management system, 101 display control unit, 102 connection processing unit, 103 location information notification unit, 201 connection processing unit, 202 information acquisition unit, 203 area setting unit, 204 route setting unit, 205 entry/exit point setting unit, 206 boundary setting unit, 207 distance calculation unit, 208 required time calculation unit, 209 route calculation unit, 210 information output unit, 211 delivery worker information area, 212 vehicle information area, 213 delivery destination information area, 214 map information area, 215 management information area, 301 display control unit, 302 connection processing unit, 303 evaluation information request unit, 304 server information acquisition unit.

The invention claimed is:

1. A route subdivision apparatus configured to subdivide a travel route for conducting work, comprising:
a microprocessor and a memory coupled to the microprocessor, wherein
the microprocessor is configured to function as:
an area setting unit configured to set a plurality of work areas on a map;
a route setting unit configured to set a scheduled route from a start point to an end point so that the scheduled route passes consecutively through a first area, a second area, and a third area of the plurality of work areas;
an entry/exit point setting unit configured to set an entry point and an exit point of the scheduled route set by the route setting unit in each work area of the plurality of work areas;
a boundary setting unit configured to set a boundary point between the exit point of the first area and the entry point of the second area and between the exit point of the second area and the entry point of the third area; and
a distance calculation unit configured to calculate a length of a distance of each section divided by a plurality of the boundary points set by the boundary setting unit on the scheduled route.

2. The route subdivision apparatus according to claim 1, wherein
the microprocessor is configured to function as:
a required time calculation unit configured to calculate a required time for passing through the length of the distance based on the length of the distance calculated by the distance calculation unit and a predetermined scheduled travel speed.

3. The route subdivision apparatus according to claim 1, wherein
the route setting unit sets the scheduled route so that the scheduled route passes through the start point and then the first area, wherein
the boundary setting unit further sets the boundary point between the start point and the entry point of the first area.

4. The route subdivision apparatus according to claim 1, wherein
the route setting unit sets the scheduled route so that the scheduled route passes through the third area and then the end point, wherein
the boundary setting unit further sets the boundary point between the exit point of the third area and the end point.

5. The route subdivision apparatus according to claim 1, wherein
the area setting unit sets a non-work area between the first area and the second area or between the second area and the third area, wherein
the boundary setting unit further sets the boundary point between the first area or the second area immediately before the non-work area, and between the non-work area and the second area or the third area immediately behind the non-work area.

6. The route subdivision apparatus according to claim 1, wherein
the area setting unit sets a non-work area between the first area and the second area or between the second area and the third area when the length of the distance between the exit point of the first area and the entry point of the second area or between the exit point of the second area and the entry point of the third area on the scheduled route is equal to or longer than a predetermined value, wherein
the boundary setting unit further sets the boundary point between the first area or the second area immediately before the non-work area and between the non-work area and the second area or the third area immediately behind the non-work area.

7. The route subdivision apparatus according to claim 3, wherein
the area setting unit sets a non-work area between the start point and the first area, wherein
the boundary setting unit sets the boundary point between the start point and the non-work area and between the non-work area and the entry point of the first area.

8. The route subdivision apparatus according to claim 4, wherein
the area setting unit sets a non-work area between the third area and the end point, wherein
the boundary setting unit sets the boundary point between the exit point of the third area and the non-work area and between the non-work area and the end point.

9. The route subdivision apparatus according to claim 1, wherein
the microprocessor is configured to function as:
an information acquisition unit configured to acquire location information of a worker who conducts work traveling on the plurality of work areas and time information corresponding to the location information; and
a route calculation unit configured to calculate an actual route of the worker based on the location information and the time information acquired by the information acquisition unit, wherein
the required time calculation unit further calculates a required time for passing through each section divided by a plurality of the boundary points set by the boundary setting unit on the actual route calculated by the route calculation unit based on the time information acquired by the information acquisition unit.

10. A route subdivision apparatus configured to subdivide a travel route for conducting work, comprising:
a microprocessor and a memory coupled to the microprocessor, wherein
the microprocessor is configured to perform:
setting a plurality of work areas on a map;
setting a scheduled route from a start point to an end point so that the scheduled route passes consecutively through a first area, a second area, and a third area of the plurality of work areas;
setting an entry point and an exit point of the scheduled route in each work area of the plurality of work areas;
setting a boundary point between the exit point of the first area and the entry point of the second area and between the exit point of the second area and the entry point of the third area; and
calculating a length of a distance of each section divided by a plurality of the boundary points on the scheduled route.

11. The route subdivision apparatus according to claim 10, wherein
the microprocessor is configured to perform:
calculating a required time for passing through the length of the distance based on the length of the distance and a predetermined scheduled travel speed.

12. The route subdivision apparatus according to claim 10, wherein
the microprocessor is configured to perform:
the route setting including setting the scheduled route so that the scheduled route passes through the start point and then the first area; and
the boundary setting including further setting the boundary point between the start point and the entry point of the first area.

13. The route subdivision apparatus according to claim 10, wherein
the microprocessor is configured to perform:
the route setting including setting the scheduled route so that the scheduled route passes through the third area and then the end point; and
the boundary setting including further setting the boundary point between the exit point of the third area and the end point.

14. The route subdivision apparatus according to claim 10, wherein
the microprocessor is configured to perform:
the area setting including setting a non-work area between the first area and the second area or between the second area and the third area; and
the boundary setting including further setting the boundary point between the first area or the second area immediately before the non-work area, and between the non-work area and the second area or the third area immediately behind the non-work area.

15. The route subdivision apparatus according to claim 10, wherein
the microprocessor is configured to perform:
the area setting including setting a non-work area between the first area and the second area or between the second area and the third area when the length of the distance between the exit point of the first area and the entry point of the second area or between the exit point of the second area and the entry point of the third area on the scheduled route is equal to or longer than a predetermined value; and
the boundary setting including further setting the boundary point between the first area or the second area immediately before the non-work area, and between the non-work area and the second area or the third area immediately behind the non-work area.

16. The route subdivision apparatus according to claim 12, wherein
the microprocessor is configured to perform:
the area setting including setting a non-work area between the start point and the first area; and
the boundary setting including setting the boundary point between the start point and the non-work area and between the non-work area and the entry point of the first area.

17. The route subdivision apparatus according to claim 13, wherein
the microprocessor is configured to perform:
the area setting including setting a non-work area between the third area and the end point; and
the boundary setting including setting the boundary point between the exit point of the third area and the non-work area and between the non-work area and the end point.

18. The route subdivision apparatus according to claim 10, wherein
the microprocessor is configured to perform:
acquiring location information of a worker who conducts work traveling on the plurality of work areas and time information corresponding to the location information; and
calculating an actual route of the worker based on the location information and the time information acquired in the acquiring, wherein
the microprocessor is configured to perform:
the required time calculating including further calculating a required time for passing through each section divided by a plurality of the boundary points on the actual route calculated in the calculating based on the time information acquired in the acquiring.

* * * * *